Feb. 16, 1937.  C. P. SANDER ET AL  2,070,926

VALVE AND ROCKER ARM ASSEMBLY FOR RADIAL ENGINES

Filed June 17, 1935  2 Sheets-Sheet 1

Inventor
Charles P. Sander
Gunnar Edenquist
Walter H. Righter
By
Attorney

Inventor
Charles P. Sander
Gunnar Edenquist
Walter H. Righter

Patented Feb. 16, 1937

2,070,926

UNITED STATES PATENT OFFICE 2,070,926

VALVE AND ROCKER ARM ASSEMBLY FOR RADIAL ENGINES

Charles P. Sander and Walter H. Righter, Glendale, and Gunnar Edenquist, Los Angeles, Calif., assignors to Kinner Airplane & Motor Corp., Ltd., a corporation of California Application June 17, 1935, Serial No. 26,972

12 Claims. (Cl. 123—90)

This invention has to do in a general way with radial aircraft engines and is more particularly related to improvements in the valve mechanism for such engines.

Our invention contemplates the use of a pair or set of co-operating valves adapted to simultaneous actuation in both the exhaust and intake side of the cylinder head whereby the port area may be materially increased. Since we are aware of the fact that dual valves of this general nature have heretofore been incorporated in various types of engines, it becomes the principal object of this invention to produce an improved gear or mechanism for actuating such valves.

The primary object in the valve operating mechanism design is to provide such a valve mechanism wherein the overall diameter of the engine incorporated with the same is materially reduced over the conventional type of radial engine construction. This object is accomplished in a general way by using a balance bar which engages the upper ends of the valve stems and locating the rocker arm a substantial distance inwardly toward the center of the engine from the outer ends of the valve stems or from the balance bar. The inner end of the balance bar is connected to the rocker arm by means of a connecting link.

It is a further object of this invention to provide a balance bar and connecting link construction which will apply a substantially equalized and straight line force to both of the valve stems regardless of any relative weakness which may develop in one or the other of the valve springs.

It is a still further object of this invention to produce a device of the class described which is of extreme compactness in construction and, in attaining this object, we provide a construction in which the rocker arm swings in the plane defined by the two valve stems, one of the valve stems being situated between the pivotal axis of the rocker arm and the connecting link above referred to. In line with this object our invention contemplates an improved and novel type of rocker arm which is expanded or divided at its midportion to form an enlarged opening which surrounds the intermediate valve stem and compression spring assembly. Further, to facilitate the installation and assembly of the valve operating mechanism, our invention contemplates mounting the rocker arm upon an axle which in turn is supported in roller bearings contained in outwardly extending wall sections on the cylinder head. And as a further feature toward obtaining compactness in construction, the axis of this axle is situated so as to pass through or immediately adjacent a portion of the compression spring on the intermediate valve stem, the intermediate portion of the axle being offset so as to clear the adjacent compression spring.

The details in the construction of a preferred form of our invention, together with other objects attending its production, will be best understood from the following description of the accompanying drawings, which are chosen for illustrative purposes only, and in which Fig. 1 is an elevational view showing the upper end portion of a cylinder head assembly of the type contemplated by this invention, a portion of such view being broken away to illustrate the construction of one of the valve assemblies;

Figure 1:
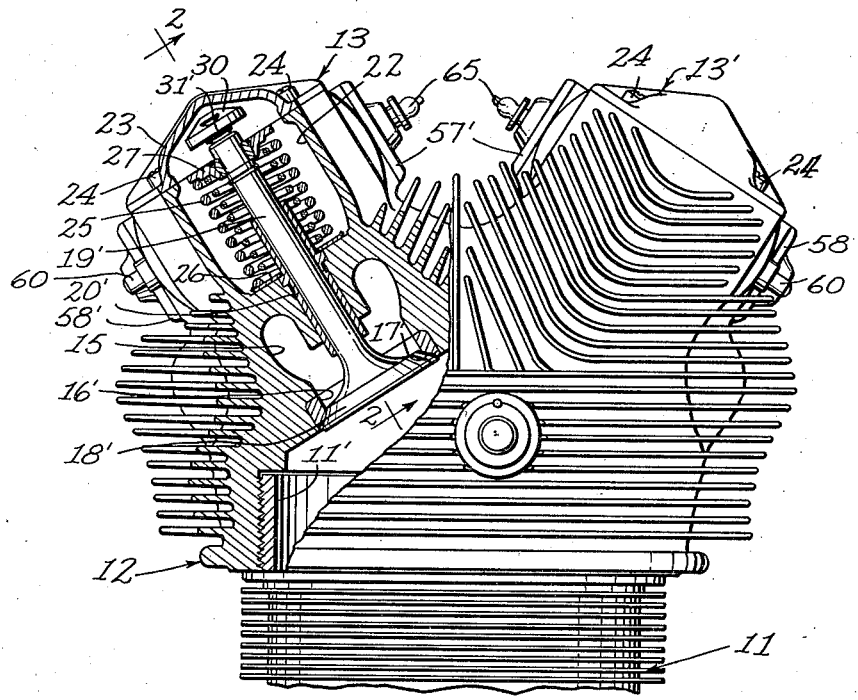

More particularly describing the invention as herein illustrated, reference numeral 11 indicates the upper end portion of a cylinder in an air cooled radial combustion engine. Numeral 12 indicates a cylinder head of the so-called "valve in head" type which is shown as being threaded on the upper end of the cylinder 11, such cylinder head being provided with valve housings indicated by reference numerals 13 and 13'. Inasmuch as the valve housings and their associated valve mechanism are identical in structure, only one of them is shown and described in detail herein.

Figure 2:
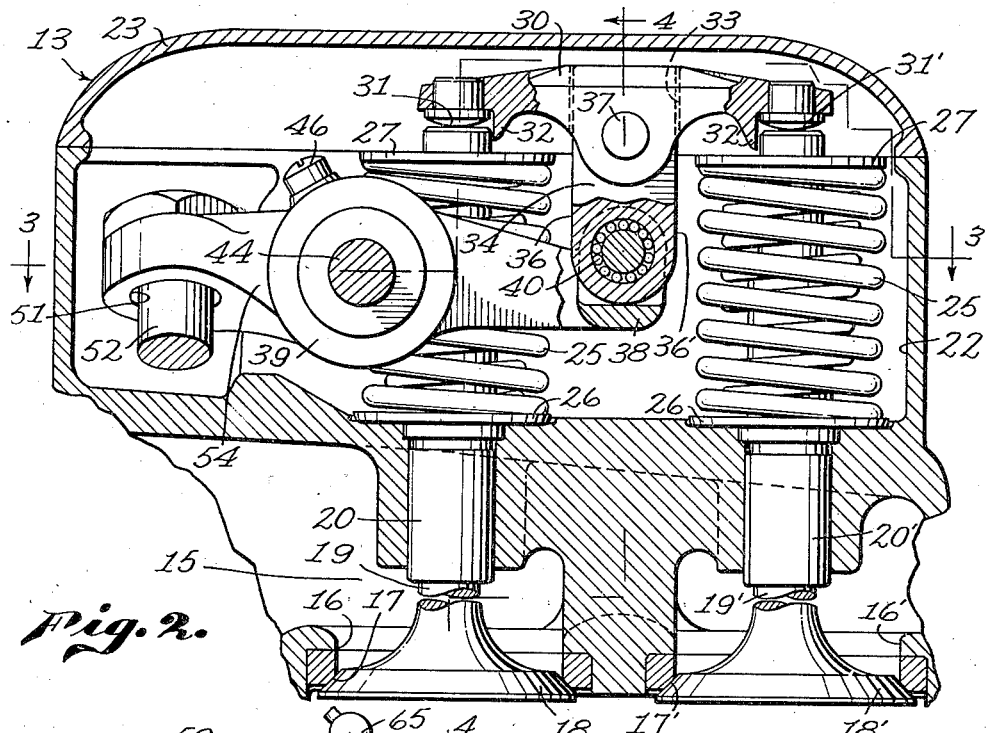
Fig. 2 is an enlarged fragmentary section taken in a plane represented by the line 2—2 of Fig. 1.

The housing 13 is shown as being provided in its bottom portion with a chamber or passage 15 which is adapted to be connected with either an intake or an exhaust manifold in any preferred manner well known to those familiar with the art. The chamber 15 communicates with the upper end portion of the combustion chamber 11' through the medium of two ports shown in Fig. 2 and indicated by reference numerals 16 and 16'. These ports are provided with valve seats 17 and 17' which are engaged by valves 18 and 18'. The valves 18 and 18' have upwardly extending valve stems 19 and 19' which extend through guides 20 and 20' mounted in apertures formed in the housing 13 and in the upper portion of the chambers therein. The upper ends of the valve stems extend into what may be termed the enclosing housing 13 which is formed by an outwardly extending wall portion 22 provided with a cover member 23 secured thereto by means of screws 24. Both of the valve stems are equipped with the conventional type of compression spring 25 which is interposed between the face plates 26 on the cylinder head and a washer member 27 which is locked to the upper end of the valve stem in any suitable manner.

It was previously pointed out as one object of this invention to simultaneously actuate both of the valves 18 and 18' and to equalize this cooperating action of the valves in a manner such that both are simultaneously opened substantially the same amount irrespective of any weakness which may have developed in one of the valve springs. This object is accomplished through the medium of what we may term a balance bar 30, the ends of which are positioned over the upper ends of the valve stems 19 and 19' and are provided with convex buttons 31 and 31' adapted to engage the upper end of the valve stem. It is to be observed that the ends of the balance bar 30 are provided with downwardly projecting lips or shoulders 32 and 32' which engage oppositely disposed faces on the valve stems 19 and 19' so that the balance bar is always held in normal relation to the two valve stems, thereby advancing the valve stems in substantially equal relation irrespective of any weakness which may have developed in one of the valve springs.

For the purpose of actuating the balance bar 30 to depress the valve stems against the action of the compression springs, we show the midportion of the balance bar as being provided with a rectangular opening 33 which receives the upper end portion of a link member 34. This link member is made substantially rectangular in cross section so that its two side faces 35 and 35' are in sliding engagement with the inner side faces of the rectangular openings. The other cross sectional diameter of the link member is such that there is a slight clearance between the faces 36 and 36' of the link and the corresponding faces in the rectangular opening, such faces being parallel to the pivot point of the connecting link. This link, it will be observed, is pivotally connected in the balance bar through the medium of a pin 37.

The lower end portion of the link 34 is pivotally attached in the end 38 of a rocker arm 39. The pivotal connection between the rocker arm and the link is shown as being in the nature of a ball bearing but various types of bearings may be used for this purpose, a conventional needle bearing being one desirable form. The bearing in this form of our invention is indicated by reference numeral 40 and it will be observed that the pivot pin or bearing 40 is parallel to the pivot pin 37 and is also parallel to the two faces 36 and 36' which are in spaced relation with the corresponding faces in the opening 33 in the balance bar. Through this arrangement it will be observed that the spaces between the faces 36, 36' and the corresponding faces in the balance bar provide for sufficient swing of the links during the operation of the connecting rod to permit a substantially straight line motion of the balance bar. In other words, these spaces are provided for the purpose of correcting for the arc through which the pivot point 40 of the link and rocker arm swings.

It will be observed in this form of our invention that the rocker arm is positioned so as to swing in the same plane that contains the two valve stems. This arrangement is employed to obtain the maximum compactness in construction and it is an important feature of this invention that through this arangement one of the valve stems and its associated compression spring is interposed between the connecting link 34 and the pivot point of the rocker arm. It is a further important feature of the invention that the complete rocker arm assembly is situated at a substantial distance inward from the outer end portions of the valve stems. This as contrasted with the conventional construction in which the rocker arm is positioned outside of or above the valve stem makes for a substantial decrease in the overall diameter of the engine.

Figure 4:
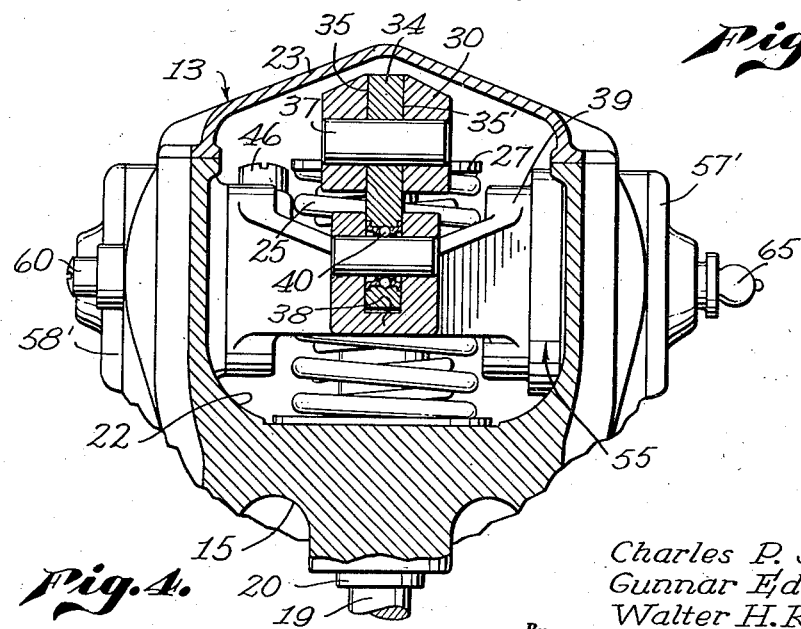
Fig. 4 is an enlarged fragmentary sectional elevation taken in a plane represented by the line 4—4 of Fig. 2.
Figure 3:
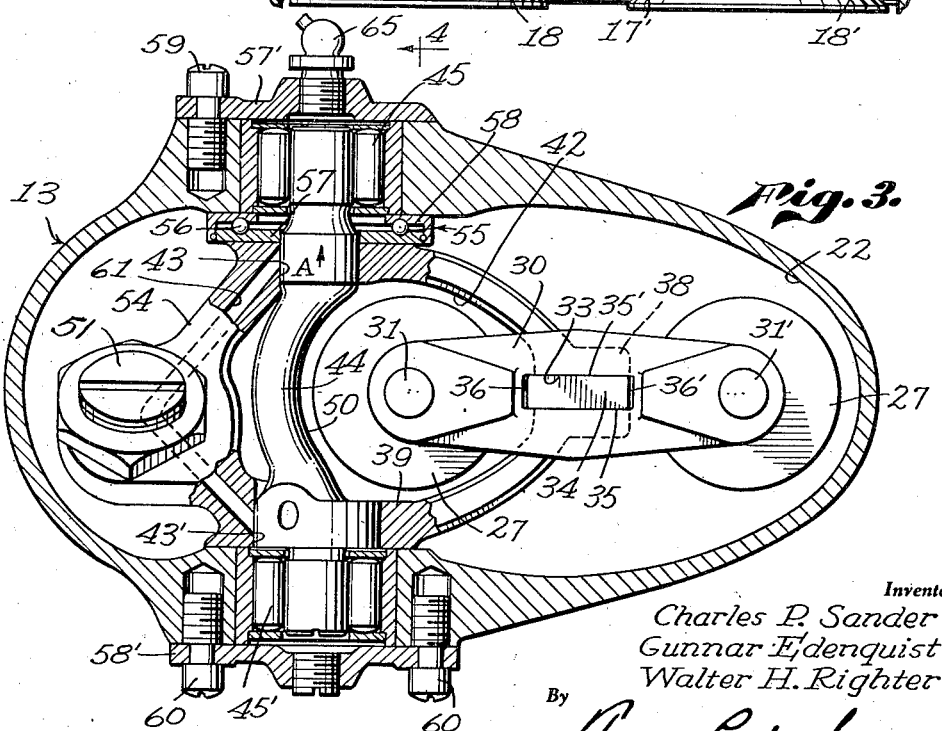
Fig. 3 is a plan section taken in a plane represented by the line 3—3 of Fig. 2.

In order to obtain these objects it is necessary to employ a novel form of rocker arm, the shape of which is perhaps best illustrated in Figs. 3 and 4. It will be observed that the rocker arm 39 is expanded or divided at its intermediate portion so as to form an enlarged opening 42 therein. This opening 42 surrounds the compression spring on the valve stem 19 and permits free movement of the rocker arm relative thereto. In order to obtain a uniform distribution of forces in a device of this character we consider it advisable to support the rocker arm in the two opposite sides of the enlarged opening 42. With this object in mind we provide the two sides of the rocker arm section 42 with openings 43 and 43' through which a rocker arm shaft or axle 44 extends. The ends of the shaft 44 are shown as being supported on roller bearings 45 and 45' and the rocker arm is rigidly secured to the shaft through the medium of a set screw indicated by reference numeral 46. In order to obtain further compactness in construction we prefer to position the rocker arm axle 44 so that its axis passes through or immediately adjacent one edge of the compression spring 25 which is associated with the valve stem 19. In doing this it is necessary to bend or radially offset the intermediate portion of the rocker arm axle 44 in the manner indicated by reference numeral 50.

The end of the rocker arm opposite the connecting link 34 is provided with an adjustable push rod socket or recess 51 which is adapted to receive the upper end of a push rod indicated at 52. Due to the fact that the push rods and the valve stems are not on the same radial plane with respect to the center of the engine, it is necessary to angularly offset the rear end portion of the rocker arm. In other words, push rod socket portions indicated by reference numeral 54 may be considered as having been angularly twisted with respect to the plane containing the rocker arm axle, and it will be observed therefore that the thrust upon the rocker arm is in the general direction of the arrow A of Fig. 3. In addition to the bearings 45 and 45', therefore, we provide a thrust bearing 55, which is shown as being in the nature of ball bearings 56 interposed between plates 57 on the rocker arm and a compression plate 58 on the wall portion of the valve enclosing housing adjacent the opening which contains the bearing 45. Cover plates 57' and 58' are mounted over the axle bearing openings which contain bearings 45 and 45', respectively, such cover plates being held in place by means of screws 59 and 60.

For the purpose of lubricating the two rocker arm axle bearings 45 and 45', and also to provide lubricant to the upper end portions of the push rod, we show the rocker arm as being provided with a duct 61 which leads from the region immediately adjacent the bearing unit 45 rearwardly to the push rod socket 51 and then on to the region immediately adjacent the other bearing 45'. Lubricant is delivered into the space surrounding the bearing 45 by means of a pressure grease fitting 65, such lubricant being applied under sufficient pressure to force the same through the first bearing 45, then into and through the duct 61 which communicates with the push rod socket and to the other bearing 45'.

It is to be understood that, while we have herein described and illustrated one preferred form of our invention, the invention is not limited to the precise construction described above but includes within its scope whatever changes fairly come within the spirit of the appended claims.

We claim as our invention:

1. In combination with a valve in head combustion engine cylinder: a pair of valve stems; means for simultaneously actuating said valve stems embodying a balance bar engaging the outer ends of said valve stems; a link attached to the midportion of said balance bar and extending inwardly between said valve stems; a rocker arm having one end pivotally attached to the inner end of said link; and bearing means pivotally supporting said rocker arm at a substantial distance inward from the outer ends of said valve stems.

2. In combination with a valve in head combustion engine cylinder: a pair of valve stems; means for simultaneously actuating said valve stems embodying a balance bar engaging the outer ends of said valve stems and having an opening in its midportion between said valve stems; a link pivotally mounted in said opening and extending inwardly between said valve stems; a rocker arm having one end pivotally attached to the inner end of said link; and bearing means on said cylinder head for pivotally supporting said rocker arm at a substantial distance inward from the outer end of said valve stems.

3. For use in simultaneously actuating a pair of valves in a valve in head combustion engine cylinder, the combination of: a pair of value stems; a balance bar engaging the outer ends of said valve stems and having a rectangular opening in its midportion; a link having a rectangular portion received in said opening and extending inwardly between said valve stems; a pivot pin connecting the end of said link to said balance bar, said link being formed so as to provide a slight clearance between the faces thereof which are parallel to said pivot pin and the corresponding faces of said opening; a rocker arm; pivot means connecting the end of said rocker arm to the inner end of said link on an axis parallel to the pivotal axis between the balance bar and the link; and bearing means on said head pivotally supporting said rocker arm at a substantial distance inward from the outer ends of said valve stems.

4. In combination with a valve in head combustion engine cylinder: a pair of valve stems; means for simultaneously actuating said valve stems embodying a balance bar engaging the outer ends of said valve stems; a link attached to the midportion of said balance bar and extending inwardly between said valve stems; a rocker arm having one end pivotally attached to the inner end of said link; and bearing means pivotally supporting said rocker arm at a substantial distance inward from the outer ends of said valve stems, said rocker arm having an enlarged opening therein surrounding one of said valve stems, the swing of said rocker arm being in a plane defined by the said valve stems.

5. In combination with a valve in head combustion engine cylinder: a pair of valve stems; means for simultaneously actuating said valve stems embodying a balance bar engaging the outer ends of said valve stems; a link attached to the midportion of said balance bar and extending inwardly between said valve stems; a rocker arm having one end pivotally attached to the inner end of said link; and bearing means pivotally supporting said rocker arm at a substantial distance inward from the outer ends of said valve stems, said rocker arm having an enlarged opening therein surrounding one of said valve stems, the valve stem thus surrounded being situated between said link and the axis of said rocker arm.

6. In combination with a valve in head combustion engine cylinder: a pair of valve stems; means for simultaneously actuating said valve stems embodying a balance bar engaging the outer ends of said valve stems and having an opening in its midportion between said valve stems; a link pivotally mounted in said opening and extending inwardly between said valve stems; a rocker arm having one end pivotally attached to the inner end of said link; and bearing means on said cylinder head for pivotally supporting said rocker arm at a substantial distance inward from the outer end of said valve stems, said rocker arm having an enlarged opening therein surrounding one of said valve stems, the swing of said rocker arm being in a plane defined by the said valve stems.

7. In combination with a valve in head combustion engine cylinder: a pair of valve stems; means for simultaneously actuating said valve stems embodying a balance bar engaging the outer ends of said valve stems and having an opening in its midportion between said valve stems; a link pivotally mounted in said opening and extending inwardly between said valve stems; a rocker arm having one end pivotally attached to the inner end of said link; and bearing means on said cylinder head for pivotally supporting said rocker arm at a substantial distance inward from the outer end of said valve stem so that the swing of said rocker arm is in the plane of the said valve stems, said rocker arm having an enlarged opening therein surrounding one of said valves, the valve stem thus surrounded being situated between said link and the axis of said rocker arm.

8. For use in simultaneously actuating a pair of valves in a valve in head combustion engine cylinder, the combination of: a pair of valve stems; a balance bar engaging the outer ends of said valve stems and having a rectangular opening in its midportion; a link having a rectangular portion received in said opening and extending inwardly between said valve stems; a pivot pin connecting the end of said link to said balance bar, said link being formed so as to provide a slight clearance between the faces thereof which are parallel to said pivot pin and the corresponding faces of said opening; a rocker arm; pivot means connecting the end of said rocker arm to the inner end of said link on an axis parallel to the pivotal axis between the balance bar and the link; and bearing means on said head pivotally supporting said rocker arm, so that the swing of said rocker arm is in the plane of the said valve stems, said rocker arm having an enlarged opening therein surrounding one of said valve stems, the valve stem thus surrounded being situated between said link and the pivotal axis of said rocker arm.

9. In combination with the cylinder head of a valve in head combustion engine, the combination of: a pair of co-operating valves having outwardly extending stems; compression springs on said stems; a balance bar engaging the upper ends of said stems; a link attached to the midportion of said balance bar and extending inwardly between said springs; said cylinder head being formed with an outwardly extending wall having bearing supporting sections on opposite sides of one of said springs and extending completely around said springs; an axle member pivotally mounted between said wall sections with its axis normal to a plane containing both of said stems; a rocker arm having an expanded midportion surrounding one of said springs and secured at the sides thereof to said axle; means pivotally connecting one end of said rocker arm to said link; and means on the other end of said rocker arm adapted to be engaged by a push rod.

10. In combination with the cylinder head of a valve in head combustion engine, the combination of: a pair of co-operating valves having outwardly extending stems; compression springs on said stems; a balance bar engaging the upper ends of said stems; a link attached to the midportion of said balance bar and extending inwardly between said springs; said cylinder head being formed with an outwardly extending wall having bearing supporting sections on opposite sides of one of said springs; an axle member pivotally mounted between said wall sections with its axis normal to a plane containing both of said stems; a rocker arm having an expanded midportion surrounding one of said springs and secured at the sides thereof to said axle, the midportion of said axle being offset away from the adjacent valve springs; means pivotally connecting one end of said rocker arm to said link; and means on the other end of said rocker arm adapted to be engaged by a push rod.

11. In a cylinder head, a pair of co-operating valves having outwardly extending valve stems surrounded by compression springs; a balance bar mechanism engaging the ends of said valve stems; an expanded rocker arm surrounding one of said springs; bearing means supporting said rocker arm on an axis outside of the space between said valve stems; and means connecting the end of said rocker arm which lies between said springs with said balance bar mechanism.

12. In combination with a valve in head combustion motor cylinder: a pair of valve stems; means for simultaneously actuating said valve stems embodying a balance bar engaging the outer ends of said valve stems; a link attached to the midportion of said balance bar between said valve stems; a rocker arm having one end pivotally attached to the inner end of said link; and bearing means pivotally supporting said rocker arm at a substantial distance inward from the outer ends of said valve stems, said rocker arm being positioned so that its plane of swing contains both of said valve stems, and being provided with an enlarged open portion surrounding one of said valve stems.

CHARLES P. SANDER.
WALTER H. RIGHTER.
GUNNAR EDENQUIST.